United States Patent [19]

Herring et al.

[11] 4,238,998

[45] Dec. 16, 1980

[54] METHODS OF PORTIONING AND PORTIONING MACHINES

[76] Inventors: Michael T. A. Herring, 51 Longell Hills, Costessey, Norwich; Richard Knight, 54 Church St., Deeping St. James, both of England

[21] Appl. No.: 4,379

[22] Filed: Jan. 18, 1979

[30] Foreign Application Priority Data

Jan. 24, 1978 [GB] United Kingdom ............... 2770/78

[51] Int. Cl.³ ............................................. B30B 11/22
[52] U.S. Cl. .................................. 100/41; 100/98 R; 100/215; 100/218; 100/257; 100/268; 222/452
[58] Field of Search .................. 100/41, DIG. 5, 215, 100/292, 218, 268, 257, 45, 98 R, 246, 247, 249, DIG. 10, 250; 222/452, 448, 372

[56] References Cited

U.S. PATENT DOCUMENTS

| 816,374 | 3/1906 | Pratt | 100/DIG. 5 |
|---|---|---|---|
| 1,648,554 | 11/1927 | Lundin et al. | 222/372 X |
| 1,960,435 | 5/1934 | Dudley | 100/DIG. 5 |
| 2,529,457 | 11/1950 | Nilsson | 222/448 X |
| 3,565,297 | 2/1971 | Bladt | 100/218 |
| 3,823,663 | 7/1974 | Reifenhaeuser | 100/250 |

FOREIGN PATENT DOCUMENTS

| 442290 | 6/1912 | France . |
| 355056 | 8/1931 | United Kingdom . |
| 614714 | 7/1947 | United Kingdom . |
| 690375 | 4/1953 | United Kingdom . |
| 710277 | 6/1954 | United Kingdom . |
| 829591 | 3/1960 | United Kingdom . |
| 836377 | 6/1960 | United Kingdom . |
| 1004292 | 5/1962 | United Kingdom . |
| 961532 | 6/1964 | United Kingdom . |

*Primary Examiner*—Billy J. Wilhite
*Attorney, Agent, or Firm*—Frailey & Ratner

[57] ABSTRACT

A method of portioning a material and a portioning machine for carrying out the method, the portioning machine comprising a body having an inlet and outlet with gate means movable within the body to selectively open the inlet and the outlet and piston means for compacting material in said body to a predetermined density and for extruding a predetermined quantity of material from the outlet. The piston may be provided with pressure sensitive means which are adjustable so that the density of material compacted can be preselected.

22 Claims, 7 Drawing Figures

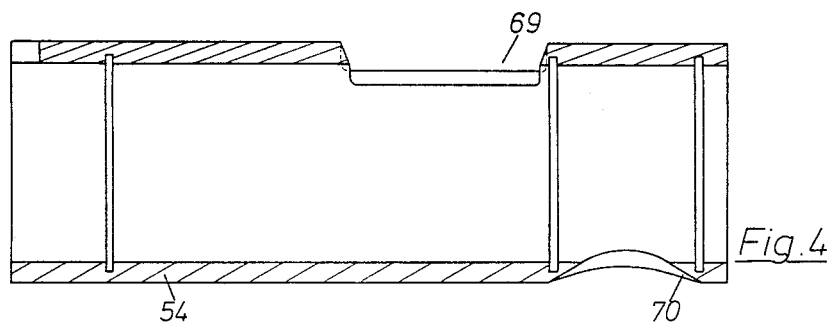
Fig. 4
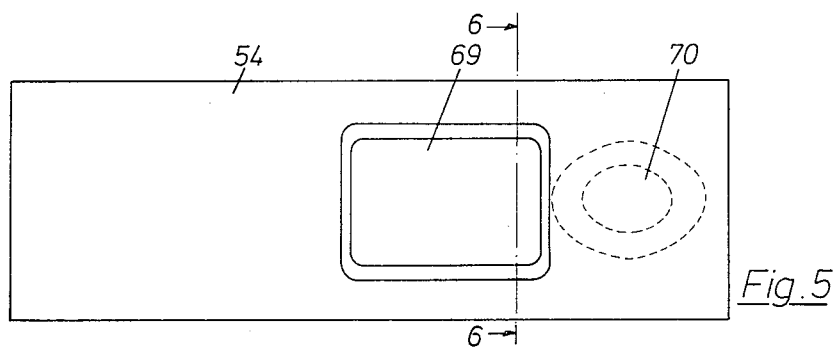
Fig. 5
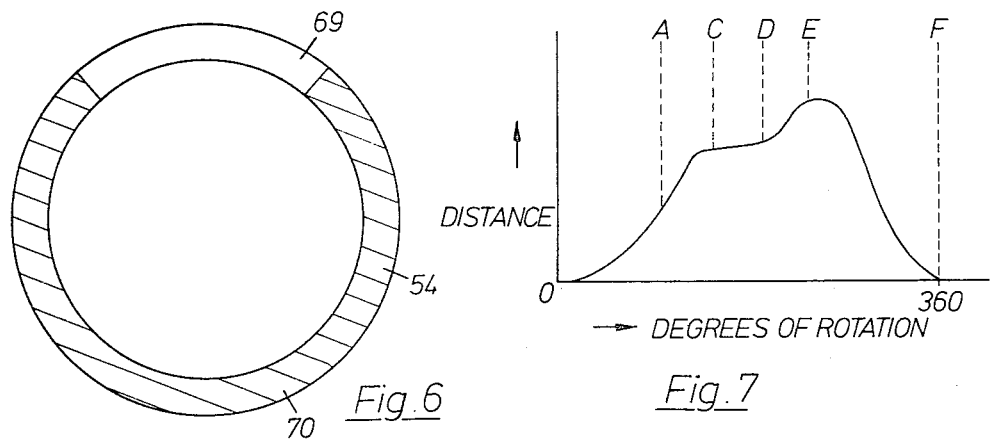
Fig. 6
Fig. 7

METHODS OF PORTIONING AND PORTIONING MACHINES

This invention relates to methods of portioning and to portioning machines.

According to one aspect of the present invention a method of portioning a material comprises introducing an unmeasured quantity of material into a body, compacting said material to a predetermined density and extruding a predetermined quantity of said compacted material from said body.

According to another aspect of the present invention a portioning machine comprises a body having an inlet and an outlet, gate means movable within said body to selectively open said inlet and said outlet, and piston means for compacting material to be portioned in said body and for extruding a predetermined quantity of said material from said outlet.

Advantageously the said body is cylindrical and preferably said gate means comprises a rotary gate adapted to be rotated within said cylindrical body.

The gate means may comprise at least one aperture for communication with said inlet and at least one aperture for communication with said outlet.

Where a rotary gate is employed within a cylindrical body the apertures in said rotary gate are preferably off-set from one another longitudinally of the axis of rotation of said gate.

Conveniently the inlet of said body is connected to a hopper for receiving material to be portioned. The outlet may be disposed adjacent to material transporting means, e.g. a conveyor.

Where a rotary gate is employed said piston means may comprise a piston which is movable longitudinally of the axis of rotation of said gate. The piston may be connected to a longitudinally extending piston rod, the rod being connected to pressure sensitive means whereby the piston will be driven only until a predetermined resistance to movement is experienced by the piston. In this way a predetermined density of material to be portioned can be established in the gate.

Conveniently the pressure sensitive means comprises a spring arrangement, which may be, for example, a mechanical, pneumatic or hydraulic spring.

In one form of the invention the rotary gate is driven from a rotatable shaft by suitable gear means and the piston rod extends longitudinally through said gear means. At the end of said piston rod remote from the piston, pressure sensitive spring means are provided which spring means may be reciprocated by a cam follower disposed in a cam track rotated by the rotatable shaft which drives the gear means for the rotary gate.

Advantageously the inlet aperture in said rotary gate is so shaped as to match the body inlet. Normally the body inlet is generally rectangular to suit a rectangular hopper and in this case an elongate generally rectangular inlet aperture is provided in said rotary gate.

Similarly the outlet aperture of said rotary gate is also shaped to match the outlet from said body. Where said outlet is circular said outlet aperture will have semicircular leading and trailing edges.

Conveniently the inlet aperture and/or the outlet aperture of said rotary gate is provided with a cutting edge on said trailing surfaces to assist in severing the mass of material extending therethrough as the body is rotated.

The shape of the outlet from the body is determined by the shape of the desired extrudate. This will often be circular but it will be appreciated that it is possible to extrude any desired section. To this end replacable outlets of different shapes may be provided with the machine.

Reference is now made to the accompanying drawings in which:

FIG. 4 is a cross section of the main body of the portioning machine;

FIG. 5 is a plan view of the main body of the portioning machine;

FIG. 6 is a cross section on the line 6—6 of FIG. 5; and

FIG. 7 is a diagrammatic illustration of the machine cycle.

Figure 1:
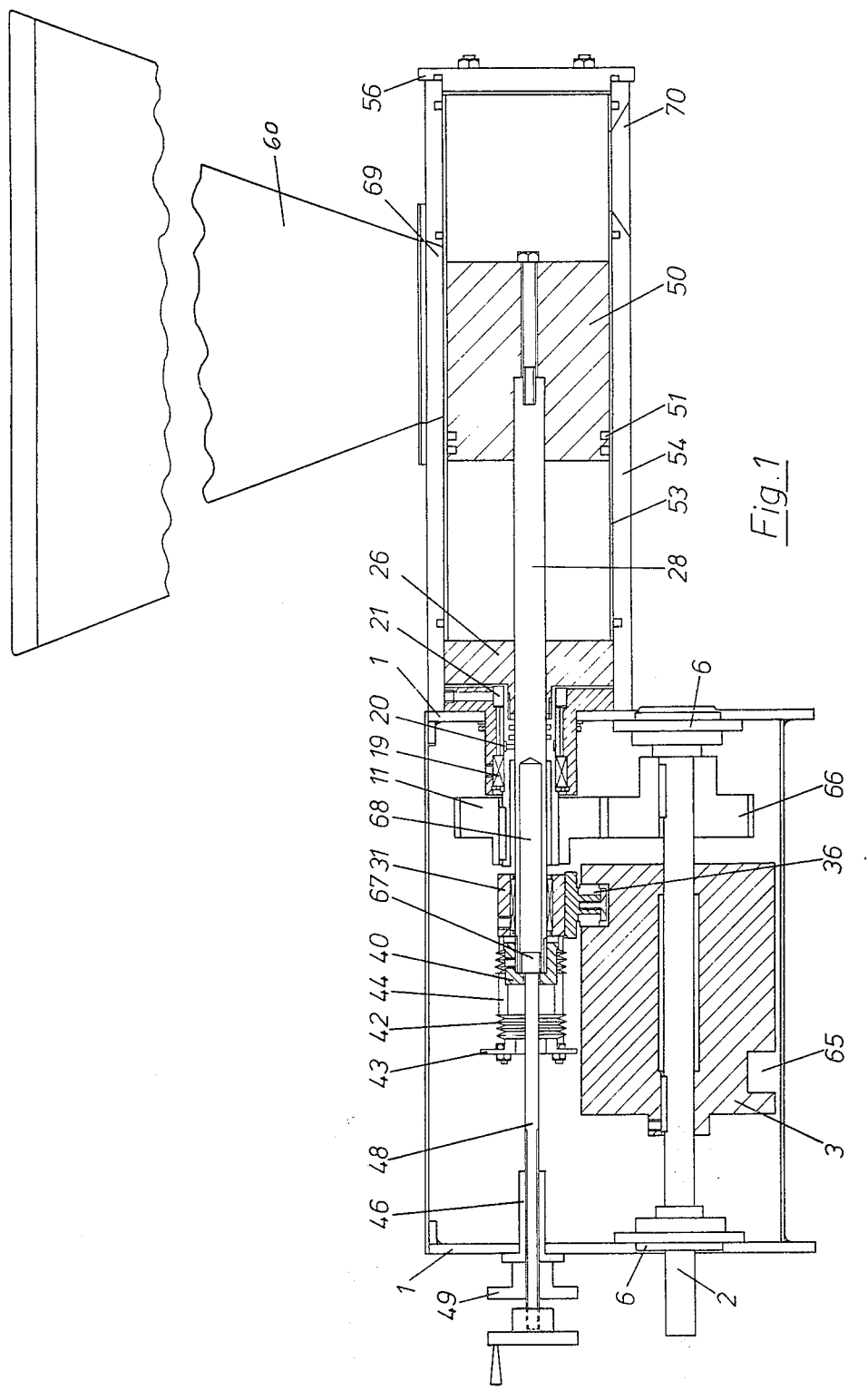
FIG. 1 is a longitudinal section of a portioning machine according to the present invention.

The portioning machine is shown in FIG. 1 and comprises a portioning section at the right hand side of the drawing and drive means therefor on the left hand side of the drawing.

The portioning section of the machine comprises a main body 54 of generally cylindrical shape and being secured at one end to a frame 1 and closed at the other end by an end plate 56.

The precise shape of the body is shown in FIGS. 4, 5 and 6 and, as can be seen from those drawings, it includes an inlet 69 which is of generally rectangular shape and an outlet 70 which is elliptically shaped. As can be seen from the drawings the walls of both the inlet and the outlet are tapered outwardly from the interior of the body to the exterior thereof.

Figure 2:
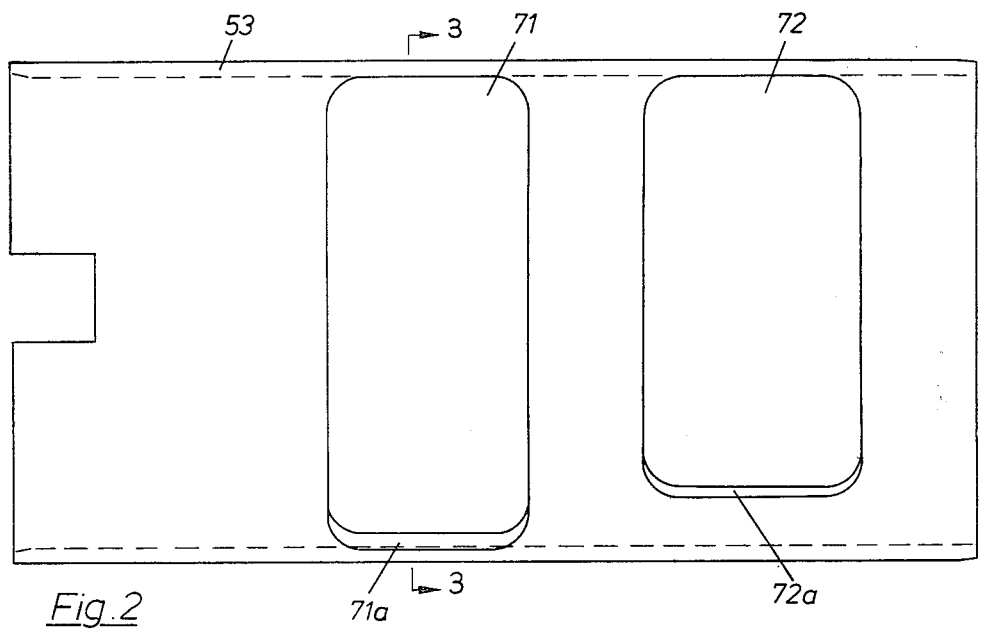
FIG. 2 is a plan view of one form of rotary gate for use in a machine according to the invention.
Figure 3:
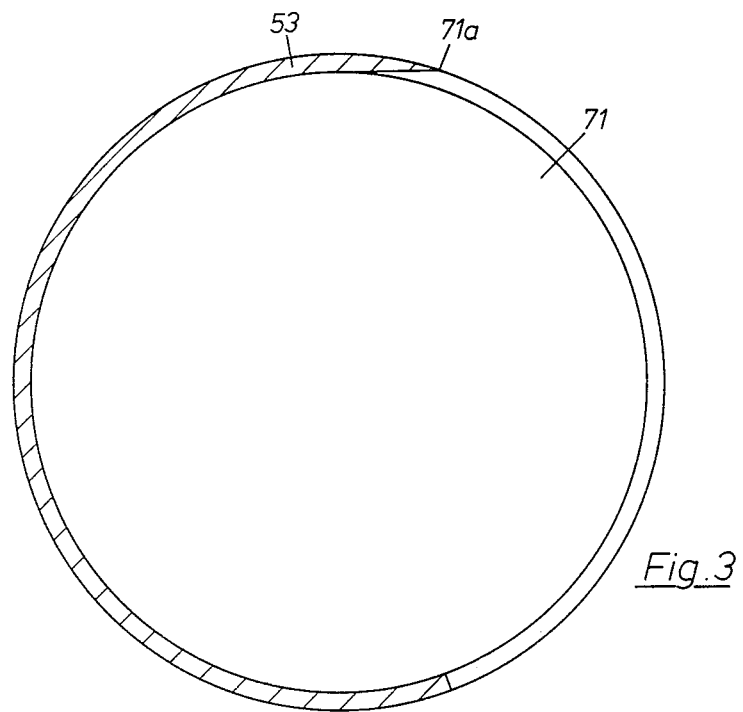
FIG. 3 is a cross section on the line 3—3 in FIG. 2.

Within the cylindrical body 54 a cylindrical rotary gate 53 is arranged for rotation. Details of the gate can be seen from FIGS. 2 and 3 of the drawings. The gate includes an elongated generally rectangular inlet gate or aperture 71 and an elongated generally rectangular outlet gate or aperture 72 the position of these being such that they control the flow of material through the inlet 69 into the interior of the gate and through the outlet 70.

Each trailing edge of the gate 71 and 72 is bevelled to provide cutting edges 71a and 72a respectively.

A piston 50 having a sealing ring 51 is mounted for longitudinal movement within the cylindrical rotary gate 53. The piston is mounted at one end on a piston rod 28 arranged to reciprocate the piston within the gate 53.

The drive means is supported in a main frame 1 to which the portioning body 54 is attached. The main drive shaft 2 extends between bearings 6 in the frame 1 and carries barrel cam 3 and a gear wheel 66 both of which are keyed to the shaft for rotation therewith.

The barrel cam 3 includes a cam track 65 which receives a cam follower 36 to apply a reciprocating linear motion to pressure sensitive means. The pressure sensitive means comprises a spring support 40 which can move relative to the rods 44 which extend between the bridge 31 and the spring plate 43. The spring support 40 carries a disc spring 42 and the arrangement is such that as the cam follower 36 is reciprocated the force is transmitted to the piston rod 28 via the disc spring 42 so that when the piston rod experiences the predetermined resistance (due to compacting of the material to a predetermined density by the piston 50 against the end plate 56) then no further movement will be transmitted to the piston rod and the motion will be taken up by the disc spring 42.

The predetermined resistance or density can, of course, be selected by adjusting the pressure applied by the spring. Normally the machine will be used for portioning one type of material and adjustment in service will not be required. If desired, however, provision for adjustment in service could be made and this may be facilitated by the use of hydraulic or pneumatic spring means.

The drive means for the rotary gate 53 comprises a gear 11 which has a bore through which the piston rod 28 passes. The drive from the gear 11 is transmitted via a drive dog 26 which runs in bearings 19, 20 and 21.

The gear 11 is in mesh with the gear 66 which is keyed on the drive shaft 2.

The maximum stroke of the piston is controlled by means of the rod 48 which has a screw threaded portion engaged in an internally threaded adjustment bush 46. At one end the rod 48 has an adjusting hand wheel 49 and at the other end an enlarged head 67 which is received in a longitudinal bore 68 in the piston rod and can abut the spring support member 40. Thus the movement of the piston will be determined when the spring support 40 abuts the enlarged head 67 and the position of the latter can be adjusted by rotating the hand wheel 49.

The operation of the portioning machine is as follows. Material to be portioned is loaded into the hopper 60 and the arrangement of the cylindrical rotary gate 53 and the piston 50 is such that the inlet gate 71 communicates with the inlet opening 69 when the piston is retracted to the left hand side of the rotary gate 53 as shown in FIG. 1. This is the initial position illustrated in the diagram of FIG. 7.

In this position material enters cylindrical chamber 54 through inlet 69 and inlet gate 71 and the piston moves towards the right as shown in FIG. 1 until at position A in FIG. 7 the inlet gate 71 is closed. Therefore the piston continues its forward movement a selected distance until a predetermined pressure is applied to the material and at this stage further movement of the piston is avoided by virtue of the provision of the pressure sensitive means.

The compacted material within the rotary gate 53 is now at a predetermined density and at the point C the outlet gate 72 begins to open the outlet or extrusion orifice 70. When the outlet is completely open at D the piston can begin to move forward again a second selected distance, thereby extruding material from said outlet. The limit of this extruding is determined by the position of the end stop 67 and this is illustrated on the diagram by position E.

When the predetermined quantity or portion of compacted material has been extruded from the orifice 70, the piston will move to the left until it reaches the starting position indicated by F.

It will be appreciated that during the above described cycle both the piston 50 and the rotary gate 53 will have completed one complete cycle of their movement.

It will be appreciated from the description of the operation of the machine that the material discharged from the outlet 70 will have both a consistent volume and a consistent density. Thus very precise and reproducible portioning of the material is made possible by the use of such a machine.

The machine according to the invention has been found to be particularly suitable for portioning compressible viscous materials such as dough or slurries of food products such as meat products.

The machine according to the invention has many advantages over conventional portioning machines. In particular it is much simpler in construction, smaller and has fewer individual components making the machine more reliable, less expensive to manufacture and much simpler to maintain. In addition the machine is relatively narrow so that a number of them can be arranged in parallel to portion materials, for example, to a common conveyor.

We claim:

1. A method of portioning a compressible viscous material such as a food product comprising introducing an unmeasured quantity of the material into a cylindrical chamber having piston means therein, compacting said material to a predetermined density in the chamber by said piston means and then discharging a predetermined portion of the compacted material from the chamber by opening an extrusion orifice communicating with the chamber, applying extrusion pressure to the material in the chamber by said piston means and reducing the volume of the chamber by a predetermined amount which is substantially less than the original volume of the chamber to extrude the predetermined portion of the compacted material through said extrusion orifice.

2. A method of portioning a material according to claim 1 in which the chamber has an inlet, further including the step of opening said inlet by apertured rotary gate means to permit material to be introduced into said chamber, the apertures in said rotary gate being off-set from one another longitudinally of the axis of rotation of said gate.

3. A method of portioning a material according to claim 2 in which said inlet of said body is connected to a hopper for receiving material to be portioned.

4. A method of portioning a material according to claim 2 in which said outlet is disposed adjacent to material transporting means.

5. A portioning machine for a compressible viscous material such as a food product comprising a cylindrical chamber having an inlet for introducing an unmeasured quantity of the material into the chamber and an extrusion orifice, gate means for intermittently opening the extrusion orifice, piston means disposed in the chamber and drive means for actuating the piston means first to compact said material to a predetermined density in the chamber and then, after the extrusion orifice is opened, to apply extrusion pressure to the compacted material in the chamber to extrude a predetermined portion of the compacted material through said extrusion orifice by reducing the volume of the chamber by a predetermined amount which is substantially less than the original volume of the chamber.

6. A portioning machine according to claim 5, in which said means for opening the extrusion orifice comprises a rotary gate adapted to be rotated within said cylindrical chamber.

7. A portioning machine according to claim 6 in which said gate means comprises at least one aperture for communication with said inlet and at least one aperture for communication with said extrusion orifice, said apertures being off-set from one another longitudinally of the axis of rotation of said gate.

8. A portioning machine according to claim 5 in which said inlet of said chamber is connected to a hopper for receiving material to be portioned.

9. A portioning machine according to claim 5 in which said extrusion orifice is disposed adjacent to material transporting means.

10. A portioning machine comprising a cylindrical body having an inlet and an outlet rotary gate means movable within said body to selectively open said inlet and said outlet, and piston means for compacting material to be portioned in said body and for extruding a predetermined quantity of said material from said outlet, said piston means comprising a piston which is movable longitudinally of the axis of rotation of said rotary gate and said piston being connected to a longitudinally extending piston rod, the rod being connected to pressure sensitive means.

11. A portioning machine according to claim 10 in which said pressure sensitive means comprises a spring arrangement.

12. A portioning machine according to claim 11 in which said spring arrangement is a mechanical spring.

13. A portioning machine according to claim 10 in which said rotary gate means is driven from a rotatable shaft by suitable gear means and the piston rod extends longitudinally through said gear means.

14. A portioning machine according to claim 13 in which pressure sensitive spring means are provided at the end of said piston rod remote from the piston, which spring means may be reciprocated by a cam follower disposed in a cam track rotated by the rotatable shaft which drives the gear means for the rotary gate.

15. A portioning machine according to claim 10 in which said rotary gate means includes an inlet aperture which is shaped to match the body inlet.

16. A portioning machine according to claim 15 in which said rotary gate means includes an outlet aperture which is shaped to match the body outlet.

17. A portioning machine according to claim 15 in which the inlet aperture is provided with at least one cutting edge.

18. A portioning machine according to claim 16 in which the outlet aperture is provided with at least one cutting edge.

19. A portioning machine according to claim 16 in which the inlet aperture and the outlet aperture are each provided with at least one cutting edge.

20. A portioning machine according to claim 19 in which both the inlet and outlet apertures have trailing surfaces on which are formed cutting edges.

21. A method of portioning a material comprising introducing an unmeasured quantity of the material into a cylindrical chamber having piston means therein, advancing the piston means a first selected distance to compact said material to a predetermined density in the chamber, opening an extrusion orifice communicating with the chamber and then advancing the piston means a second selected distance to apply extrusion pressure to the compacted material in the chamber to extrude a predetermined portion of the compacted material through said extrusion orifice.

22. A material portioning machine comprising a cylindrical chamber having an inlet for introducing a material into the chamber and an extrusion orifice, gate means for intermittently opening the extrusion orifice, piston means disposed in the chamber and drive means for advancing the piston means a first selected distance to compact said material to a predetermined density in the chamber and then to advance the piston means a second selected distance to apply extrusion pressure to the compacted material in the chamber after the extrusion orifice is opened to extrude a predetermined portion of the compacted material through said extrusion orifice.

* * * * *